United States Patent
Coughlan et al.

(10) Patent No.: US 12,067,415 B1
(45) Date of Patent: Aug. 20, 2024

(54) AUTOMATIC RECEIVE SIDE SCALING CONFIGURATION

(71) Applicant: Rapid7, Inc., Boston, MA (US)

(72) Inventors: Luke Coughlan, Galway (IE); Gianni Tedesco, Seoul (KR); Morgan Nally, Galway (IE)

(73) Assignee: Rapid7, Inc., Boston, MA (US)

( * ) Notice: Subject to any disclaimer, the term of this patent is extended or adjusted under 35 U.S.C. 154(b) by 16 days.

(21) Appl. No.: 18/098,180

(22) Filed: Jan. 18, 2023

(51) Int. Cl.
  *G06F 9/48* (2006.01)
  *G06F 9/445* (2018.01)

(52) U.S. Cl.
  CPC ........ *G06F 9/4812* (2013.01); *G06F 9/44505* (2013.01)

(58) Field of Classification Search
  CPC ............................ G06F 9/4812; G06F 9/44505
  See application file for complete search history.

(56) References Cited

U.S. PATENT DOCUMENTS

| | | | |
|---|---|---|---|
| 6,898,651 B2 | 5/2005 | Wang et al. | |
| 7,730,248 B2 | 6/2010 | Goss et al. | |
| 9,661,094 B2 | 3/2017 | Goel et al. | |
| 9,722,934 B2 | 8/2017 | Muniraju | |
| 9,755,972 B1* | 9/2017 | Mao | H04L 49/90 |
| 10,353,837 B2 | 7/2019 | Sengoku et al. | |
| 10,374,977 B2 | 8/2019 | Gross, IV et al. | |
| 10,681,607 B2 | 6/2020 | Shah et al. | |
| 10,694,003 B2 | 6/2020 | Taneja et al. | |
| 11,133,999 B1* | 9/2021 | Brosnan | H04L 43/0894 |
| 11,196,727 B2 | 12/2021 | Wang et al. | |
| 11,579,906 B2* | 2/2023 | Vichare | G06F 9/44505 |
| 11,758,023 B2* | 9/2023 | Kim | G06F 18/23 718/104 |
| 2011/0153839 A1* | 6/2011 | Rajan | H04L 69/16 709/227 |
| 2012/0226804 A1* | 9/2012 | Raja | H04L 43/028 709/224 |
| 2019/0140984 A1 | 5/2019 | Agarwal et al. | |
| 2019/0297015 A1* | 9/2019 | Marolia | H04L 45/60 |
| 2021/0141676 A1 | 5/2021 | Wang et al. | |
| 2021/0334126 A1* | 10/2021 | Sundararam | G06F 9/4843 |

FOREIGN PATENT DOCUMENTS

WO     2015100102     7/2015

* cited by examiner

*Primary Examiner* — Henry Tsai
*Assistant Examiner* — Christopher A Daley
(74) *Attorney, Agent, or Firm* — Ashwin Anand

(57) ABSTRACT

Various embodiments include systems and methods pertaining to a network sensor host configured to implement a receive side scaling (RSS) configuration component in a security environment. The RSS configuration component may be used to automatically generate an RSS configuration comprising one or more settings customized for the network sensor host based at least in part on hardware information of the network sensor host. In some embodiments, the RSS configuration may be applied to change settings of a network interface driver of the network sensor host, e.g., to implement RSS and multithreading for network sensor tasks.

20 Claims, 9 Drawing Sheets

AUTOMATIC RECEIVE SIDE SCALING CONFIGURATION

BACKGROUND

Many companies operate computer environments that are connected to public networks such as the internet. While such connections allow users to access resources on public networks, they also expose a company network to cyberattacks. Cyberattacks may obtain sensitive information, gain control of the company's computing systems, or damage company resources. To prevent cyberattacks, security management systems have become increasingly important to protect private company networks against these types of vulnerabilities.

Figure 1:
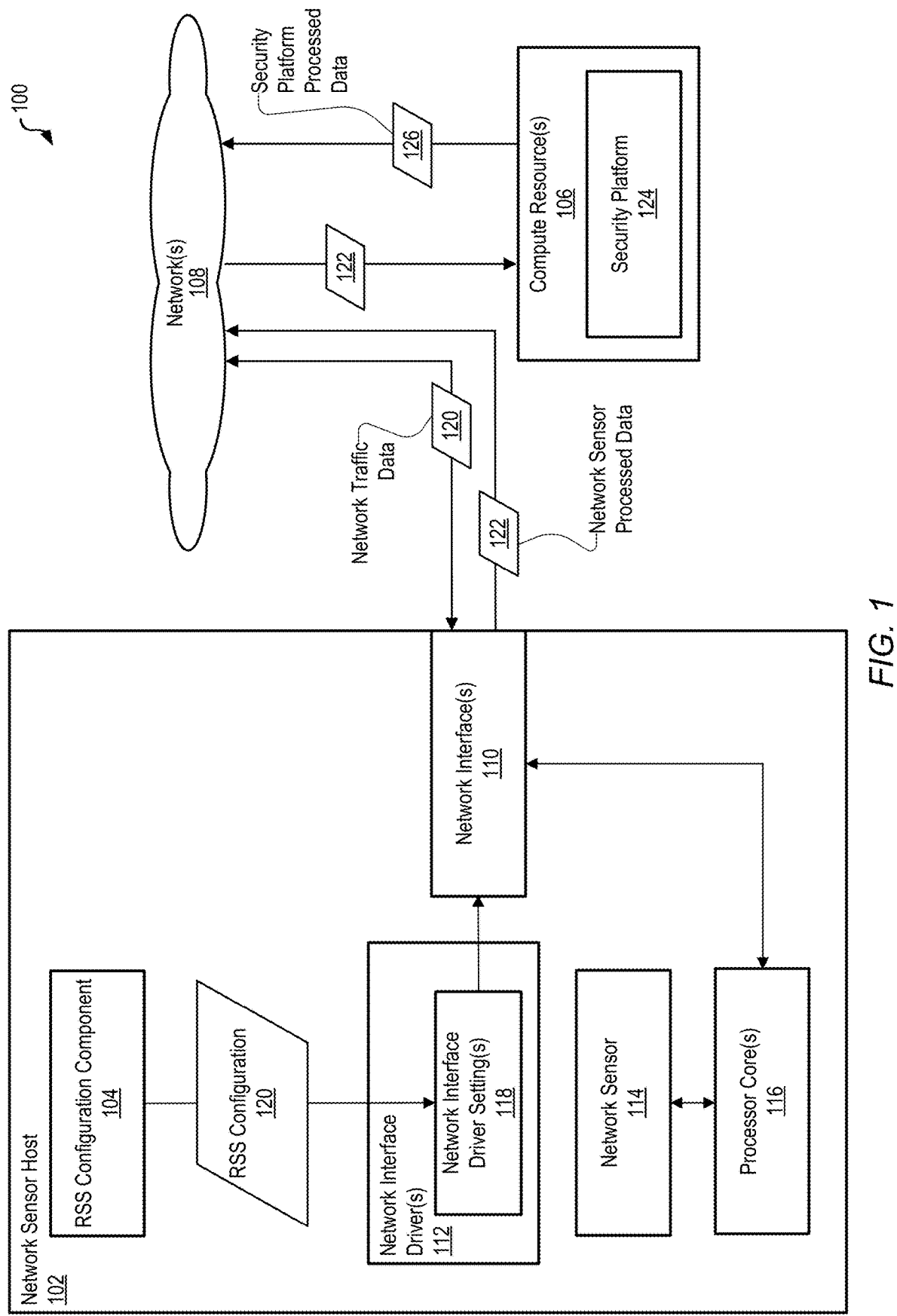
FIG. 1 is a block diagram illustrating an example security environment that may include a network sensor host that implements a receive side scaling (RSS) configuration component, in accordance with some embodiments.

While embodiments are described herein by way of example for several embodiments and illustrative drawings, those skilled in the art will recognize that embodiments are not limited to the embodiments or drawings described. It should be understood that the drawings and detailed description are not intended to limit embodiments to the particular form disclosed, but on the contrary, the intention is to cover all modifications, equivalents and alternatives falling within the spirit and scope as defined by the appended claims. As used throughout this disclosure, the word "may" is used in a permissive sense (i.e., meaning "having the potential to"), rather than the mandatory sense (i.e., meaning "must"). Similarly, the words "include," "including," and "includes" mean "including, but not limited to".

DETAILED DESCRIPTION OF EMBODIMENTS

As disclosed, a security environment may include a network sensor host configured to implement a receive side scaling (RSS) configuration component. As used herein, a network sensor host refers to a computing device that hosts a network sensor. According to various embodiments, the network sensor host may include and/or be connected to one or more network interfaces (e.g., one or more network interface cards (NICs) and/or one or more network adapters) and one or more processor cores (e.g., central processing unit (CPU) core(s)). The network sensor host may run software applications, such as the network sensor, the RSS configuration component (which may also be referred to as an "RSS configuration software component"), etc. In some embodiments, the RSS configuration component may be described (and/or depicted in the figures) as a stand-alone component (e.g., a separate component from the network sensor). However, it should be understood that in various embodiments the RSS configuration component may be a subcomponent of the network sensor.

Real time network traffic analysis requires being able to keep up to speed with the volume of traffic passing through the network. With network speeds from 1 Gb/s to 10 Gb/s, or even more, for example, the limits of what a single deep packet inspection (DPI) or intrusion detection system (IDS) thread can handle may be reached quickly. At these higher rates even the network interface may fail to meet demand with only a single queue on which traffic can be received. To scale up processing capabilities of the network sensor, embodiments disclosed herein utilize the RSS configuration component to implement multithreading for multi-core processors and RSS for the monitoring network interface of the network sensor. Switching to multithreading, however, may require a significant amount of extra resource management. For example, due to sheer variety of CPUs, NICs, network drivers, and/or other hardware that network sensors may run on, it would not be feasible to leave configuring the RSS settings of the network interface to users/operators/administrators of the network sensor or the security environment. According to various embodiments, the RSS configuration component may be used to automatically read the network sensor host hardware, and where possible scale network sensor performance to its limits.

By examining the network sensor host's hardware information, the RSS configuration component (which may be installed on and run on the network sensor host in various embodiments) may create a suitable RSS configuration to make the most of the available hardware. The RSS configuration can be applied either fully or partially, depending on the suitability of the available network interface. After applying the RSS configuration, the network sensor host may be better suited to perform high speed network traffic analysis.

As previously mentioned, a user can attempt to make RSS configuration changes to their current hardware; however, RSS configuration changes may be non-trivial depending on the user's experience, and the user may be required to have deep knowledge of their hardware information and its capabilities before they can decide how it can be configured. The techniques disclosed herein remove the burden out of the hands of the user, and mitigates the likelihood of user error in determining a suitable RSS configuration to apply.

Another possible approach to addressing the aforementioned issues may be for users to buy hardware that is preconfigured with particular software already installed; however, this approach may tie a user into purchasing an expensive piece of machinery that only has one use. Utilization of the RSS configuration component, in accordance with embodiments disclosed herein, may enable users to install software on a machine they already have and, if the hardware is suitable, it may achieve results that are comparable to those of the preconfigured hardware.

In various embodiments, techniques disclosed herein may include various operations for implementing the RSS configuration component. The operations may be performed using one or more processors. In some non-limiting embodiments, the operations may be performed by one or more processors of the network sensor host.

As will be discussed in further detail herein, the operations may include determining hardware information associated with the network sensor host. For example, the hardware information may include network interface driver information, processor core information, and/or memory information.

In various embodiments, the operations may include automatically generating an RSS configuration comprising one or more settings customized for the network sensor host based at least in part on the hardware information. For example, the setting(s) may include one or more RSS settings, one or more multithreading settings, and/or one or more interrupt request (IRQ) affinity settings.

In various embodiments, the operations may include applying the RSS configuration. For example, application of the RSS configuration may change, in accordance with the setting(s) of the RSS configuration, settings of the network interface driver.

In various embodiments, the operations may include capturing initial network interface driver settings. For example, the initial network interface driver settings may be captured at some point prior to generating and/or applying the RSS configuration. The initial network interface driver settings that are captured may be useful in certain situations, e.g., when a failure has occurred in association with generation and/or application of an RSS configuration and/or a fallback RSS configuration.

According to some embodiments, the operations may include determining that a failure has occurred in association with generation and/or application of an RSS configuration. In response, the RSS configuration component may generate and/or apply one or more fallback RSS configurations. For example, the operations may include applying a first fallback RSS configuration that sets one or more IRQ affinities without implementing RSS or multithreading (and instead implements a single threaded state).

Additionally, or alternatively, the operations may include determining that a failure has occurred in association with generation and/or application of an RSS configuration and/or in association with application of a first fallback configuration. In response, the RSS configuration component may apply a second fallback RSS configuration. For example, applying the second fallback RSS configuration may include implementing the initial network interface driver settings.

The aforementioned network sensor is a software program that is designed to analyze network traffic and extract relevant information. The network sensor typically runs on a computing device that has one or more processor cores, which are the individual processing units within a CPU. When a network packet is received by the computing device, the network sensor may distribute the packet to one or more of the processor cores for analysis. The exact number and distribution of processor cores that are used by the network sensor may depend on the specific configuration of the computing device and the sensor, as well as the workload and performance requirements of the network sensor. The network sensor may be able to adjust the distribution of packets to the processor core dynamically in order to optimize performance.

Embodiments disclosed herein utilize the RSS configuration component to scale up the processing capabilities of the network sensor. RSS is a feature of modern network interfaces that allows a computer to distribute the workload of received incoming network traffic across multiple processor cores. This can improve the performance and efficiency of the network interface, e.g., when dealing with large amounts of incoming traffic. When the network interface receives incoming traffic, it typically uses a single processor core to process the incoming data and pass it to the rest of the computer for further processing. This can be a bottleneck, especially if the incoming traffic is high in volume or if the processor core is already busy with other tasks.

RSS addresses this issue by allowing the network interface to distribute the workload of processing incoming traffic across multiple processor cores. This may be done by using a hash function to divide the incoming traffic into different "flows," with each flow being assigned to a specific processor core. The network interface may then use the assigned processor cores to process the incoming traffic in parallel, improving performance and efficiency.

As mentioned above, the RSS configuration component may implement multithreading for multi-core processors and RSS for the monitoring network interface of the network sensor. In computing, multithreading is the ability of a CPU or a single core in a multi-core processor to provide multiple threads of execution concurrently, supported by the operating system. Each thread represents a separate flow of execution, with its own program counter, stack, and local variables. This allows multiple threads to run concurrently on a single CPU, which can improve the overall performance of the system by allowing multiple tasks to be executed simultaneously. In other words, multithreading allows a CPU to do multiple things at the same time, improving speed and efficiency of the system.

The aforementioned network sensor host, which may run the RSS configuration, may include and/or be connected to one or more network interfaces. A network interface driver (e.g., an NIC driver and/or a network adapter driver) is a software program that enables the operating system on a computer to communicate with the network interface (which allows the computer to connect to a network and exchange data with other devices on the network). The network interface driver provides an interface between the operating system and the network interface. It contains instructions that the operating system can use to send and receive data over the network. The network interface driver also includes settings that allow the user to configure the network interface, such as setting the network IP address or the speed and duplex mode of the connection.

When a network sensor host receives network packets, the packets may be first passed to the network interface for processing. The network interface may pass the network packets to the network sensor for further processing. The network sensor may be a software program that is designed to analyze the packets and extract relevant information, such as the source and destination addresses, the type of packet, and the payload data. The network sensor may use this information to perform various tasks, such as monitoring network traffic for security purposes, analyzing the performance of the network, or detecting anomalies or malicious activity. After the network sensor has processed the packets, it may pass the packets to the operating system for further processing, or it may discard the packets if they are not relevant or do not need to be further analyzed. Ultimately, the packets will be delivered to their intended destination on the network, unless they are blocked or dropped by the network sensor or another component in the network.

In some embodiments, a fallback RSS configuration may include setting one or more IRQ affinities. IRQ (interrupt request) affinities may refer to the ability to assign specific IRQs to specific processor cores on a computer. IRQs are signals that are sent to the CPU by hardware devices, such as a network interface or a keyboard, to request immediate attention and processing. By assigning IRQs to specific processor cores, the operating system can control which core is responsible for handling each IRQ. This allows the system to distribute the workloads more evenly across the available processor cores, improving overall performance and reducing the likelihood of bottlenecks or other performance issues.

As previously indicated, the network sensor may monitor traffic and collect data on the types of traffic passing through a network. This data can be used to identify potential security threats and to monitor network performance. In various embodiments, the network sensor may be used to implement deep packet inspection (DPI) tasks and/or intrusion detection system (IDS) tasks.

In order to implement DPI tasks, a network sensor may use specialized software that is designed to analyze the content of network packets in detail. This allows the network sensor to examine the data contained in the packets, as well as the headers and other metadata that may be included in the packet. When a packet is received by the network sensor, the DPI software may examine the packet to determine its type and content. This may involve looking for specific keywords or patterns that may indicate a security threat, such as malware or a malicious website. The software may also analyze the packet headers to determine the source and destination of the packet, as well as other information such as the packet's size and type. DPI may be used as a valuable tool for implementing network security tasks. It allows network sensors to examine network traffic in detail, which can help to identify potential security threats and prevent them from reaching their intended targets.

In order to implement IDS tasks, the network sensor may use specialized software that is designed to analyze network traffic for suspicious activity or behavior that may indicate an attack. This software can be configured to look for specific types of behavior that may indicate an attack, such as unauthorized access to a system or abnormal patterns of network traffic. When a network sensor receives a packet, the IDS software may analyze the packet to determine its type and content. If the packet contains data that matches the patterns or keywords that have been configured in the IDS software, it may be flagged as potentially suspicious. The network sensor may then generate an alert, which can be used by network administrators to investigate the potential threat and take appropriate action. IDS tasks may be an important part of an organization's cybersecurity strategy. They help to protect against potential threats by monitoring network traffic and alerting administrators to suspicious activity, and can also take action to prevent or mitigate these threats. Network sensors may play a key role in implementing IDS tasks by analyzing network traffic and/or generating alerts when suspicious activity is detected.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

FIG. 1 is a block diagram illustrating an example security environment 100 that may include a network sensor host 102 that implements a receive side scaling (RSS) configuration component 104, in accordance with some embodiments. The security environment may further include one or more other compute resources 106 that may communicate with the network sensor host 102 over one or more networks 108. The network sensor host 102 may include, for example, the RSS configuration component 104, one or more network interfaces 110 (e.g., one or more network interface cards (NICs) and/or one or more network adapters), one or more network interface drivers 112, a network sensor 114, and one or more processor cores 116. As depicted in FIGS. 1 and 3, the RSS configuration component 104 is indicated as a stand-alone component (e.g., a separate component from the network sensor 114). However, it should be understood that in various embodiments, the RSS configuration component 104 may be a subcomponent of the network sensor 114, e.g., similar to how FIG. 2 indicates RSS configuration component 224 as a subcomponent of network sensor 226.

As described in this disclosure, for clarity, some steps are attributed to certain modules/components, in other examples, the steps, a subset of steps, or similar steps, may be performed in different orders or by different modules/components, or entirely by the network sensor host 102 without a modular delineation.

According to various embodiments, the network interface driver(s) 112 may include one or more network interface driver settings 118. In some embodiments, the RSS configuration component 104 may be configured to generate an RSS configuration 120 that can be applied to change one or more network interface driver setting(s) 118. For example, the RSS configuration component 104 may obtain and/or otherwise determine hardware information (e.g., hardware telemetry) associated with the network sensor host 102. The RSS configuration component 104 may use the hardware information to generate the RSS configuration 120 in some embodiments.

In some non-limiting embodiments, the hardware information may include processor core information, memory information, and/or network interface driver information, etc. The processor core information may be associated with the processor core(s) 116 of the network sensor host 102. In some embodiments, the processor core information may be gathered from a filesystem (e.g., sysfs and/or procfs in Linux systems). Furthermore, the gathered processor core information may be used to create a CPU topology in some embodiments. The CPU topology may indicate, for example, how many processor cores are online and/or whether the CPU supports hyperthreading. In some embodiments, the CPU topology may provide access to specific processor core identifications (IDs).

In some embodiments, the hardware information determined by the RSS configuration component 104 may include an amount of memory available to the network sensor host 102. For example, such memory information may include an amount of random access memory (RAM) on the network sensor host 102. In some embodiments, the memory information, like the processor information, may be a limiting factor for scaling of RSS, as each traffic monitoring process may require a certain amount of memory.

In some embodiments, the hardware information determined by the RSS configuration component 104 may include network interface driver information associated with one or more network interfaces 110 of the network sensor host 102. In various embodiments, the network interface driver information may include information pertaining to whether the network interface driver(s) 112 support RSS. According to some embodiments, the network interface driver information may include a wide range of network interface telemetry obtained via a utility tool/program (e.g., ethtool in Linux systems), e.g., to provide a good representation of the capabilities of the network interface(s) 110.

According to various embodiments, the RSS configuration component 104 may initiate automatic generation of an RSS configuration 120 customized for the network sensor host 102. As used herein, the term "initiate" (and its variants) may be used in connection with implementing, at least in part, the process of generating or configuring an RSS configuration as a way of indicating that one or more failures may occur during this process, and thus a particular RSS configuration with a particular objective (e.g., to implement RSS and multithreading) may not be generated, as will be discussed in greater detail herein. The RSS configuration 120 may include one or more settings that are customized for the network sensor host 102 based at least in part on the hardware information. In some non-limiting embodiments, the setting(s) of the RSS configuration 120 may include one or more RSS settings, one or more multithreading settings, and/or one or more interrupt request (IRQ) affinity settings, etc.

In response to determining that the RSS configuration 120 has been generated, the RSS configuration component 104 may initiate application of the RSS configuration 120, according to various embodiments. As used herein, the term "initiate" (and its variants) may be used in connection with implementing, at least in part, the process of applying an RSS configuration as a way of indicating that one or more failures may occur during this process, and thus a particular RSS configuration 120 may not be applied, as discussed in greater detail herein. The RSS configuration 120 may be applied to the network interface driver setting(s) 118, e.g., as indicated in FIG. 1. Application of the RSS configuration 120 may change the network interface driver setting(s) 118. According to various embodiments, the network interface driver setting(s) 118 may be changed based on the RSS configuration 120 (e.g., in accordance with the setting(s) of the RSS configuration 120).

In some non-limiting examples, the network sensor host 102 may receive network traffic data 120, e.g., via network(s) 108. The network traffic data 120 may be received at the network interface(s) 110, which may handle the incoming network traffic data 120 in accordance with the network interface driver setting(s) 118. As previously mentioned, the network interface driver setting(s) 118 may be changed based on the RSS configuration 120, and thus the network interface driver(s) 112 may be configured to enable the implementation of RSS and multithreading in some embodiments. The network interface(s) 110 may pass the network traffic data 120 to the processor core(s) 116 used by the network sensor 114 to process network sensor tasks. For example, the network interface(s) 110 may be configured to implement RSS to distribute the workload of processing the network traffic data 120 multiple processor cores using multithreading.

The network sensor host 102 may transmit network sensor processed data 122 (which may be generated by the network sensor 114 as a result of its processing of network traffic data 120) to the compute resource(s) 106, e.g., via network(s) 108. According to various embodiments, the compute resource(s) may include a security platform 124 that provides one or more security services, e.g., as discussed herein with reference to FIG. 3. In some embodiments, the security platform 124 may process the network sensor processed data 122 and generate security platform processed data 126. Furthermore, the security platform processed data 126 may be transmitted to one or more other compute resources, e.g., over network(s) 108 in some embodiments, e.g., as discussed herein with reference to FIG. 3.

Figure 2:
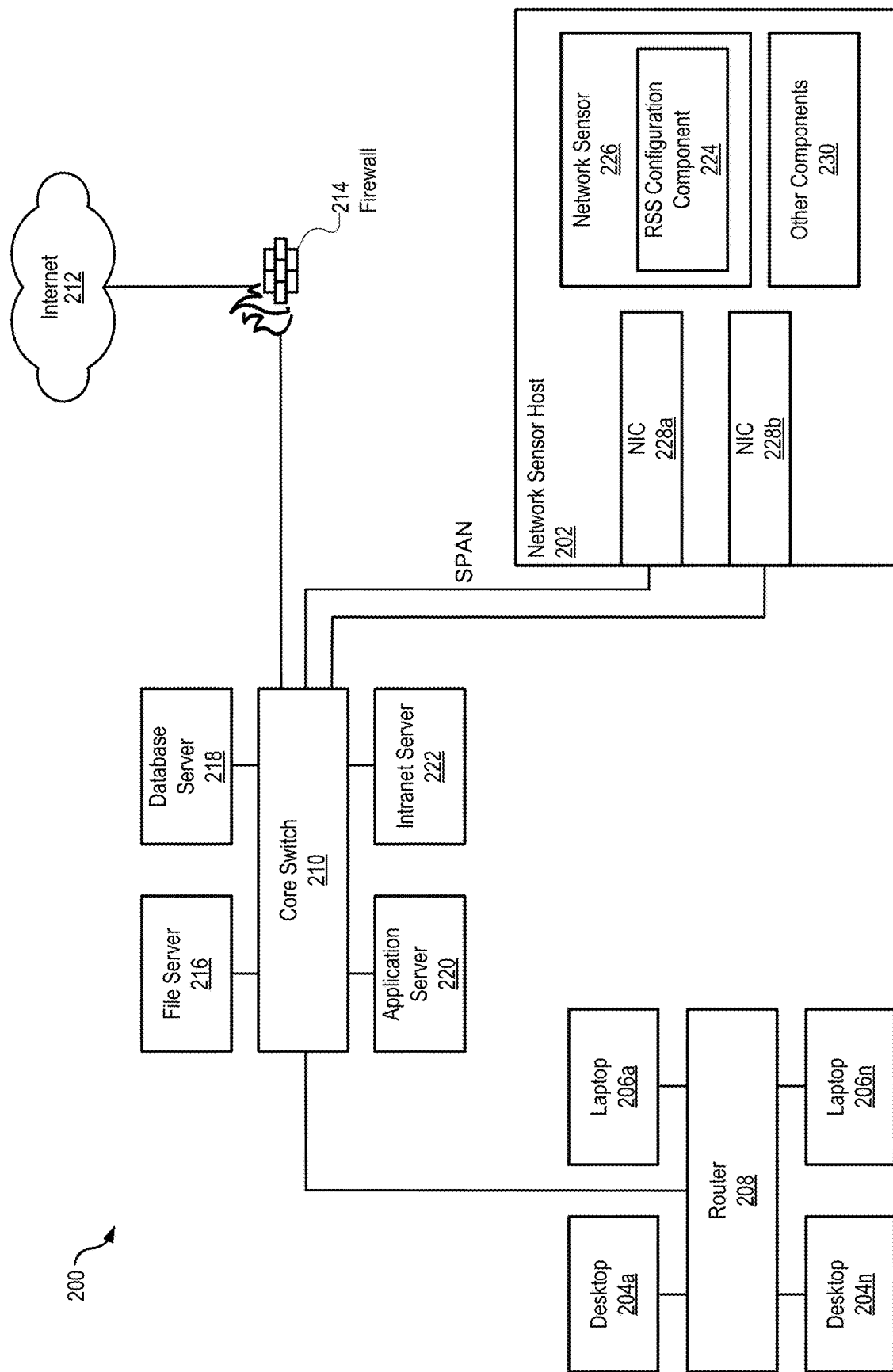
FIG. 2 is a block diagram illustrating an example security environment that may include a network sensor host that implements an RSS configuration component, in accordance with some embodiments.
Figure 3:
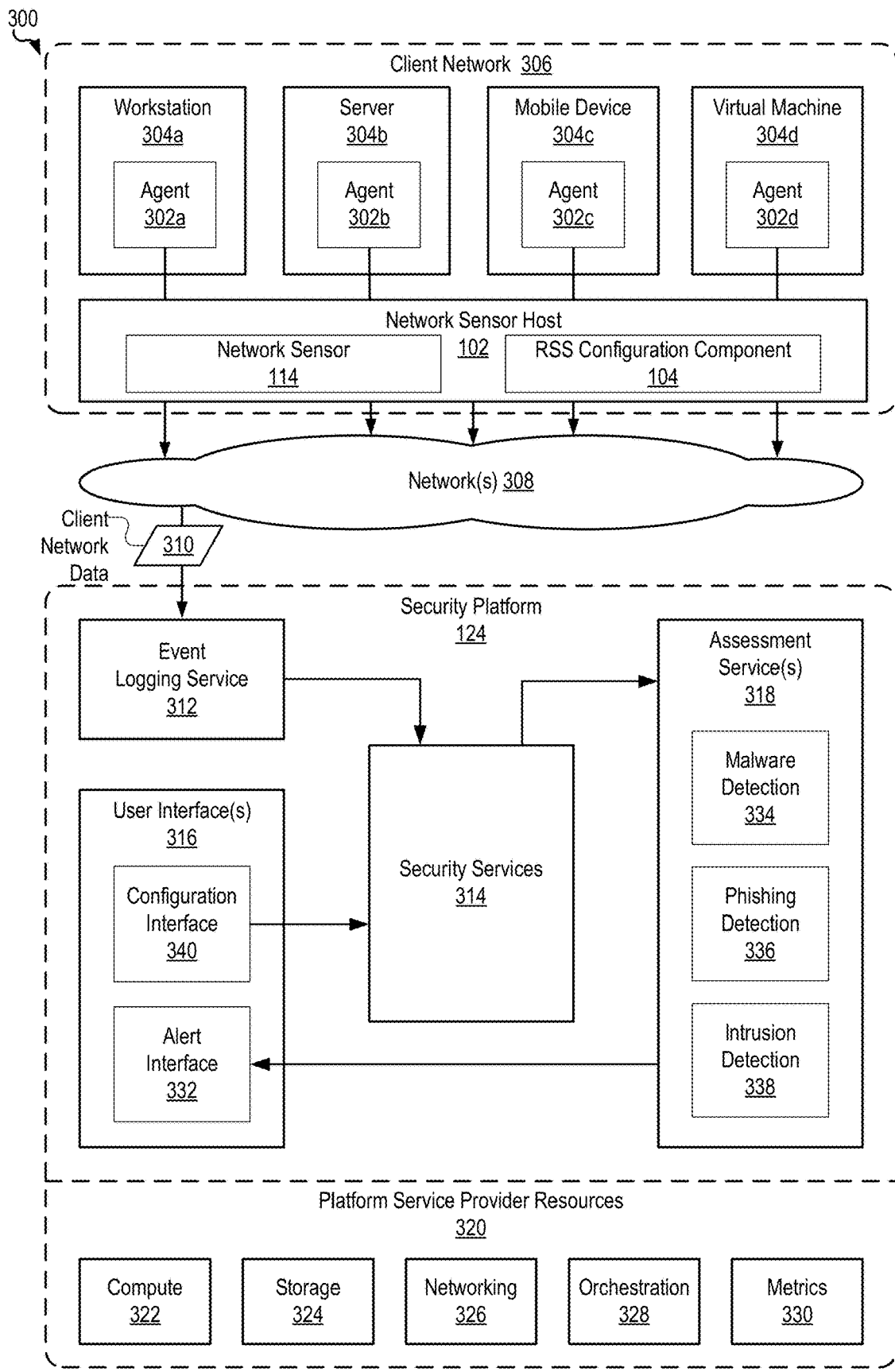
FIG. 3 is a block diagram illustrating example computing resources that implement a security platform in an example security environment, in accordance with some embodiments.

FIG. 2 is a block diagram illustrating an example security environment 200 that may include a network sensor host 202 that implements an RSS configuration component, in accordance with some embodiments.

As shown in FIG. 2, desktops 204*a* and laptops 206*a-n* are communicatively coupled to a router 208. Router 208 may be communicatively coupled to a core switch 210 that also supports Internet 212 access via firewall 214 to a file server 216, a database server 218, an application server 220, and an intranet server 222. Core switch 210 may be communicatively coupled to the Internet 212 via firewall 214 and may also include a Switched Port Analyzer (SPAN) port that is communicatively coupled to the network sensor host 202. The network sensor host 202 may include an RSS configuration component 224 (e.g., similar to, or the same as, RSS configuration component 104 in FIG. 1), a network sensor 226 (e.g., network sensor 114 in FIG. 1), a NIC 228*a* (e.g., connected to a monitoring port corresponding the SPAN ports in core switch 210), a NIC 228*b* (e.g., connected to port used as a management port), and one or more other components 230.

As depicted in FIG. 2, the RSS configuration component 224 is indicated as a subcomponent of network sensor 226. However, it should be understood that in various embodiments, the RSS configuration component 224 may be a stand-alone component (e.g., a separate component from the network sensor 226), e.g., similar to how FIGS. 1 and 3 indicate RSS configuration component 104 as a stand-alone component.

The network sensor host 202 may turn raw network traffic data into actionable cybersecurity information. In a non-limiting example, the network sensor 226 may include one or more components. As a non-limiting example, the network sensor 226 may include: (a) a traffic collection engine that captures network traffic from a SPAN port or other traffic source, (b) a traffic analysis engine (or DPI engine) that applies DPI techniques to consolidate and correlate data collected by the traffic collection engine, (c) a traffic database that stores the consolidated and correlated traffic data, and/or (d) a reporting engine that sends data to the security platform for reporting, etc.

As shown in FIG. 2, NIC 228*a* is connected to a monitoring port on a network's core switch (e.g., a SPAN or mirror port on core switch 210). In some embodiments, the NIC 228 may be associated with a DPI engine and starts capturing network traffic. If there is a need to monitor network traffic in multiple data centers but only a single interface is available, in some embodiments, multiple remote network sensors may be deployed as physical machines or virtual machines that deliver a single reference point to all user and network information.

In some embodiments, the DPI engine may perform two sequential checks on traffic packets. Content-based application recognition (CBAR), provided by the DPI engine, recognizes applications and protocols regardless of the ports they use. In this example, targeted protocol decoding performs deeper analysis of commonly occurring traffic types—web, file share, and email traffic. If CBAR fails, the DPI engine proceeds to check for the existence of a targeted protocol decoder (e.g., web traffic, MSSQL, email, P2P, SMB fileshare, and the like).

In some embodiments, traffic stored in the network sensor host's 202 database is divided into three categories: (a) Unrecognized—traffic for which no CBAR application fingerprint or targeted decoder is available (for this traffic, the network sensor host 202 stores the 5-tuple that uniquely identifies the TCP/IP connection {source IP address, source port, destination IP address, destination port, and protocol} and additional information such as username and DNS details, (b) Recognized—traffic for which a CBAR application fingerprint is available (for this traffic, the network sensor host 202 stores the same information as it does for unrecognized traffic, along with additional information about the application associated with the traffic, and (c) Decoded—traffic that uses a protocol for which a network sensor host 202 decoder exists (for this traffic, the network sensor host 202 stores the same information as it does for recognized traffic along with additional information specific to the protocol: (1) Email—sender, recipient, and subject information, (2) Web— URL of every page visited and file downloaded, and (3) Windows file share—file name, file size, and action details. The traffic analysis engine aggregates all the above information in (1), (2), and (3). Therefore, because the network sensor host 202 works on traffic data directly via a SPAN or mirror port, the network sensor host 202 does not require installation of client software or interaction with devices on a client network, and does not impact network performance.

FIG. 3 is a block diagram illustrating example computing resources that implement a security platform (e.g., security platform 124 in FIG. 1) in an example security environment 300, in accordance with some embodiments.

The security platform 124 may comprise one or more services implemented within a cloud computing environment and/or on a platform service provider network, such as a platform-as-a-service (PaaS) network, an infrastructure-as-a-service provider (IaaS) network, or a software-as-a-service (SaaS) network. The security platform 124 may be configured to communicate with agents 302*a*-302*d* deployed on computing resources 304*a*-304*d* in a client network 306.

In this example, the network sensor host 102 described herein with reference to FIG. 1 may be implemented by the client network 306, along with one or more computing resources (e.g., computing resources 304*a*-304*d*). In this example, the computing resources 304*a*-304*d* are depicted as a workstation, a server, a mobile device, and a virtual machine, respectively. In other examples, a computing resource 304 may comprise personal computers, cloud compute instances, laptops, among other types of computing resources, or some other resource that may be vulnerable to a cyberattack. Computing resources are described in greater detail below.

In this example, agents 302 may communicate with the security platform 124 over one or more intermediary networks 308. In some embodiments, the agents 302 may be configured to collect or compile network activity data or network event data, and transmit the data, depicted as client network data 310, to the security platform 124. The security platform 124 may receive network activity data from many different client networks operated by different entities, companies, organizations, groups, etc., and perform remote monitoring of the networks of these different clients.

As shown, the client network 306 in this example includes different types of computing resources, such as a workstation 304*a*, a server 304*b*, a mobile device 304*c*, and a virtual machine 304*d*. The virtual machine 304*d* may be an instance of a computer and operating system that is emulated and hosted on a physical virtual machine host. The virtual machine host may implement virtualization hardware and/or software (e.g., a hypervisor) to execute and manage multiple instances of guest operating systems. Example implementations of such virtualization technologies include VMware ESX/ESXI, Microsoft Hyper-V, Amazon Web Services, and Microsoft Azure. Another type of virtualized execution environment may be a hosted container, which provides a portable and isolated execution environment over a host operating system of a physical host. Examples of container hosting technologies include Docker, Google Kubernetes, Amazon Web Services, and Microsoft Azure. In some embodiments, the virtual machine 304*d* may be hosted in a platform service provider network, such as the platform service provider network that is hosting the security platform 124. In some embodiments, the agents 302 may be deployed on other types of computing systems, including embedded systems, networking devices, storage devices, Internet-of-Things (IoT) devices, vehicles, and the like.

In various embodiments, the network 308 may encompass any suitable combination of networking hardware and protocols necessary to enable communications between the agents 302 and the security platform 124. In some embodiments, the remote machines 304 may execute in a private network of a company, behind a company firewall, and the network 308 may include a public network such as the Internet, which lies outside the firewall. The network 308 may encompass the different telecommunications networks and service providers that collectively implement the Internet.

In some embodiments, the network 308 may also include private networks such as private local area networks (LANs), private wide area networks (WANs), or private wireless networks. The network 308 may be implemented using different hardware (e.g., modems, routers, switches, load balancers, proxy servers, etc.) and software (e.g., protocol stacks, routing software, firewall/security software, etc.) for establishing networking links between the remote machines 304 and the security platform 124. In some embodiments, the agents 302 may transmit the client network data 310 to the security platform 124 over secure communication channels such as transport layer security (TLS) connections implemented over the network 308.

As shown in this example, the security platform 124 is implemented using a number of supporting services 312, 314, 316, and 318 implemented by the platform service provider network. Clients of the security platform 124 may convey service requests to and receive responses from these services via their respective service interfaces. In some embodiments, the service request and responses may be defined as part of a RESTful API (e.g., one or more web services). The requests and responses may be formatted as JSON documents. In some embodiments, the security platform 124 may implement service interfaces using other types of remote procedure calling protocols, such as Google Protocol Buffers. The platform service provider network may provide the hardware and/or software needed to implement service endpoints for these services, and the request routing facilities to ensure that a request is properly routed to the appropriate endpoints.

As shown, the platform service provider network may provide different types of computing resources, such as platform service provider resources 320, which can be used by customers to implement hosted services. As shown, the platform service provider may provide resource services such as compute resource service 322, storage resource service 324, networking resources service 326, orchestration service 328, and resource metrics service 330. The services of the security platform 124 may be built using these underlying resource services provided by the platform service provider.

In some embodiments, the platform service provider resources 320 may implement features such as load balancing of service requests and/or dynamic management and scaling of service node pools. In some embodiments, each of the services 312, 314, 316, and 318 may be implemented using a pool of service nodes provided by the platform service provider, which may be individual instances of virtual machines. In some embodiments, the platform service provider may be a provider such as Amazon Web Services or Microsoft Azure.

In some embodiments, the security platform 124 may be configured to monitor, analyze, and respond to security-related incidents that are detected in the remote client networks 306. For example, the client network data 310 may indicate network traffic data 120 and/or network sensor processed data 122, where the security platform 124 may determine a cyberattack as described herein.

In some embodiments, the security platform 124 may implement an event logging service 312 that receives client network data 310 from a client network 306 and stores the received data. The event logging service 312 may implement service functionality to allow users or other software components to query the event logs.

As shown, in some embodiments, the assessment service(s) 318 may implement a variety of monitoring processes to generate alerts in response to detected security problems in the client network 306. These alerts may be forwarded to an alert interface 332, which may allow human security analysts to perform a more in-depth examination of any underlying security problems. For example, in some embodiments, a malware detection module 334 may examine collected machine event logs to detect installation of a particular type of malware executable. As another example, a phishing detection module 336 may examine the email event logs to detect phishing attacks using new or unusual email addresses, web addresses, or email content. As yet another example, an intrusion detection module 338 may examine the network event logs to detect suspicious communication patterns or attacker packet signatures. In some embodiments, the alerts generated by the assessment service(s) 318 may trigger automated mitigation actions to be performed on the client network 306 to address detected threats in the client network.

In some embodiments, the security platform 124 may implement one or more user interface(s) 316, which may be implemented as GUIs or web interfaces viewable using a web browser. In some embodiments, these user interfaces 316 may be implemented by client-side applications. As shown, the user interfaces may include the alert interface 332 to notify users of detected alerts. In some embodiments, the alert interface 332 may be accessible from both the client network 306 and a central monitoring location where security analysts are monitoring the client network.

In some embodiments, the user interface(s) 316 may also implement a configuration interface 340. The configuration interface 340 may be used to configure various aspects of the security platform 124, including the security service 314. For example, the configuration interface 340 may be used to control various aspects of how the security service 314 operates, including initiating a scan, indicating one or more computing resources, and/or specifying a scanning schedule.

In some implementations, the security platform 124 may be implemented within a container system of a cloud computing environment or a container system of a data center. For example, a container system may be implemented by one or more container orchestration systems, including Kubernetes™, Docker Swarm™, among others. The container orchestration system may run on a cluster of nodes. In some examples, a given node may comprise a container runtime, where the given node may be implemented by one or more compute instances provided by a cloud services provider. In some examples, a given node among the cluster of nodes may comprise a container runtime, compute resources, memory, and one or more container instances.

In some implementations, the security platform 124 may comprise multiple services. For example, the security platform 124 may comprise services implemented by containerized applications operating on one or more nodes of a cluster. In this example, the security platform 124 may be implemented by a one or more containerized applications.

Figure 4:
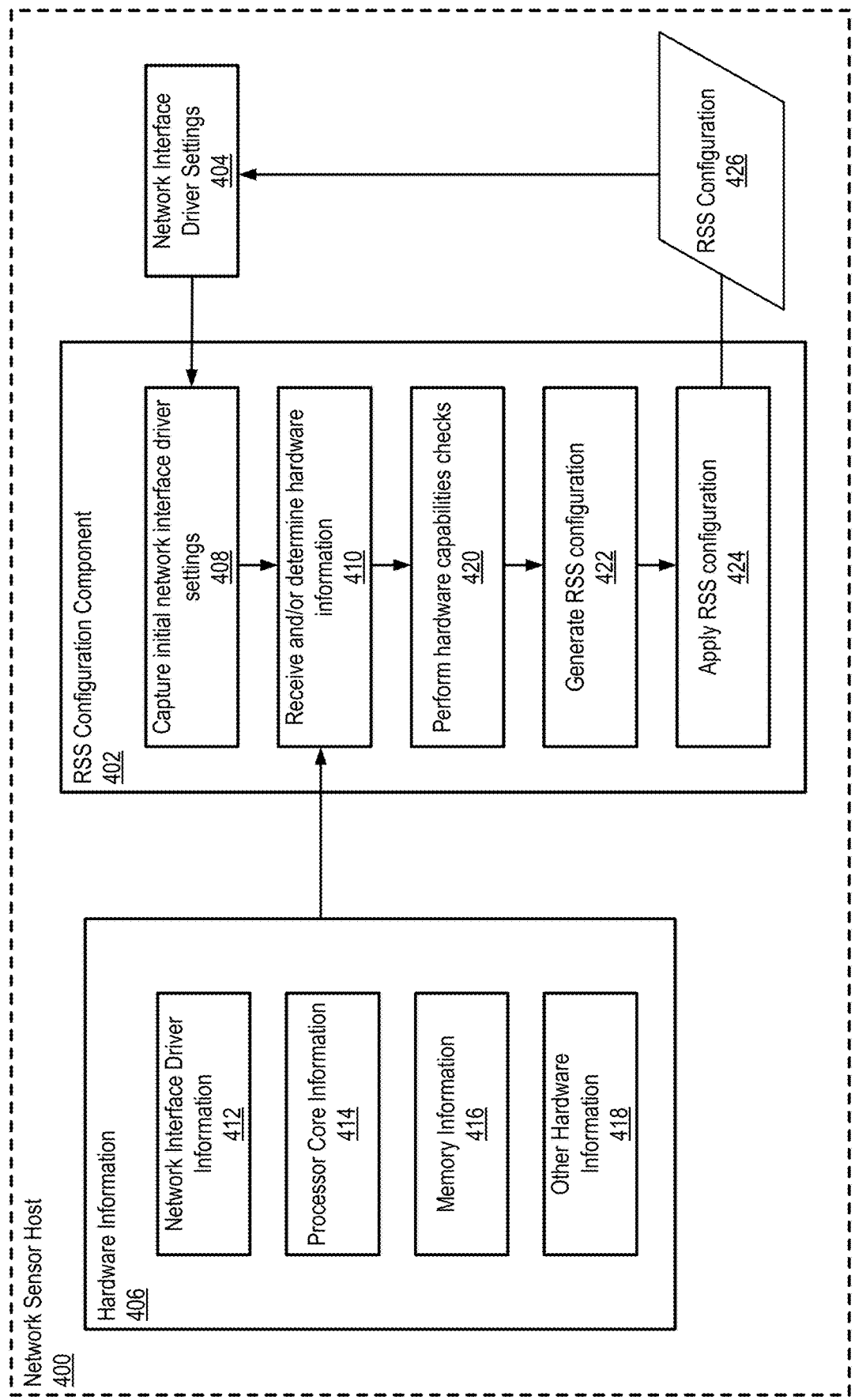
FIG. 4 is a block diagram illustrating example components of a network sensor host, in accordance with some embodiments. The block diagram includes an example process flow of certain operations that may be performed using an RSS configuration component, in accordance with some embodiments.

FIG. 4 is a block diagram illustrating example components of a network sensor host 400, in accordance with some embodiments. The block diagram includes an example process flow of certain operations that may be performed using an RSS configuration component 402, in accordance with some embodiments.

In various embodiments, the network sensor host 400 may include the RSS configuration component 402, network interface driver settings 404, hardware information 406, and/or one or more other components. The RSS configuration component 402 may be configured to perform various operations, such as the those indicated in the non-limiting example process flow.

At 408, the RSS configuration component 402 may capture initial network interface driver settings (e.g., from network interface driver settings 404). At 410, the RSS configuration component 402 may receive and/or determine hardware information (e.g., from hardware information 406). In various embodiments, the hardware information 406 may include network interface driver information 412, processor core information 414, memory information 416, and/or other hardware information 418, e.g., as discussed in further detail herein with reference to FIG. 1.

At 420, the RSS configuration component 402 may perform hardware capabilities checks. At 422, the RSS configuration component 402 may generate an RSS configuration 422. At 424, the RSS configuration component 402 may apply the RSS configuration. For example, the RSS configuration component 402 may apply RSS configuration 426 to the network interface driver settings 404, e.g., so as to change the network interface driver settings 404 in accordance with settings of the RSS configuration 426. Operations 420, 422, and 424 are discussed in further detail herein with reference to FIG. 5.

Figure 5:
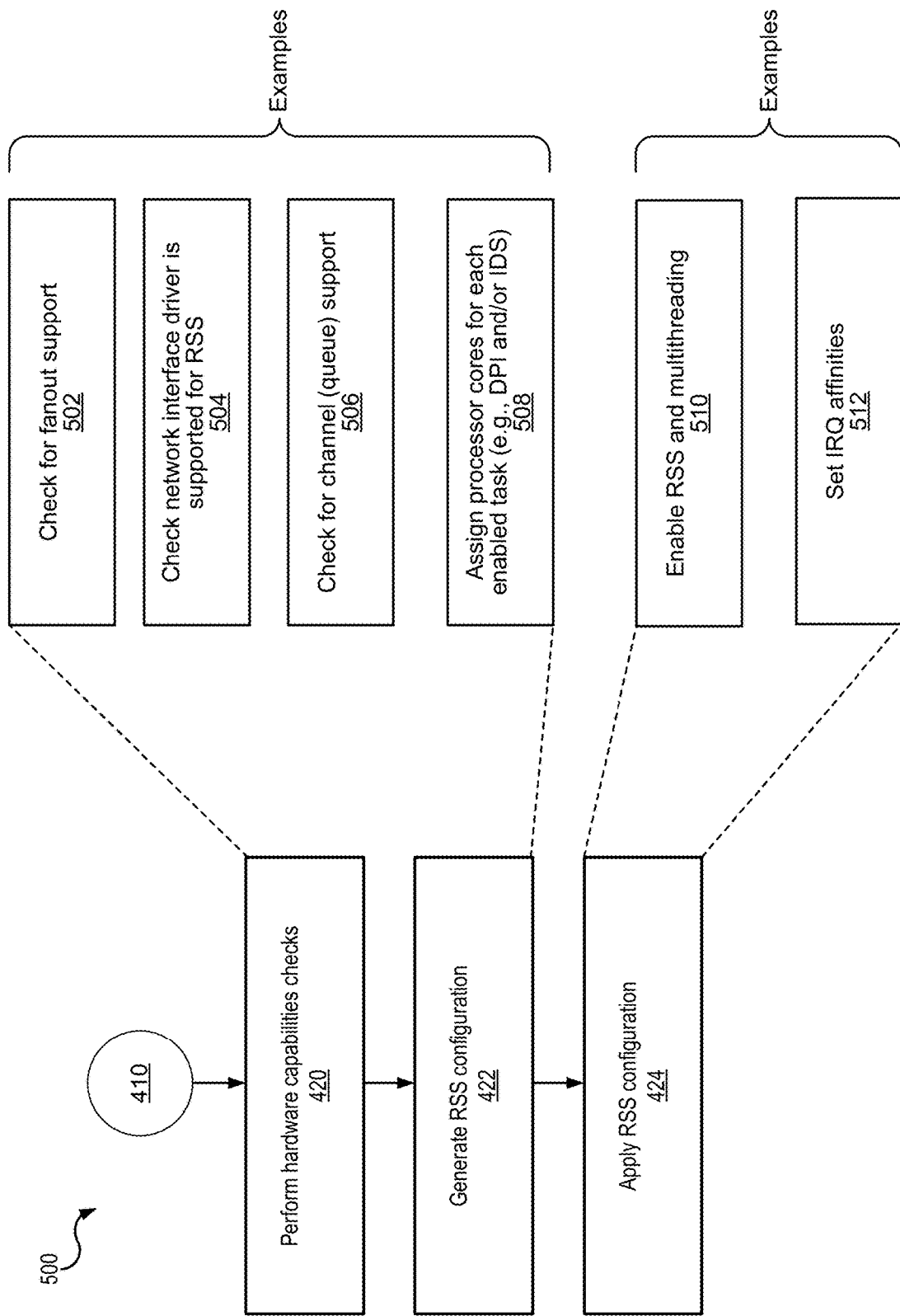
FIG. 5 is an example process flow of some operations that may be performed using an RSS configuration component, in accordance with some embodiments.

FIG. 5 is an example process flow 500 of some operations that may be performed using an RSS configuration component, in accordance with some embodiments. As indicated in FIG. 5, operations 420 (performing hardware capabilities checks) and/or 422 (generating the RSS configuration) may include: at 502, checking for fanout support; at 504, checking whether the network interface driver is supported for RSS; at 506, checking for channel (queue) support; and/or at 508, assigning processor cores for each enabled network sensor task (e.g., DPI and/or IDS, etc.), etc.

At 504, the RSS configuration component may check whether the network interface driver is supported for RSS. Some network interface drivers may not be supported for RSS, as they do not implement certain network interface configuration features required to enable RSS in some embodiments. Network sensor hosts having such unsupported network interface drivers may still be able to run the network sensor (and/or the RSS configuration component), but they may be left in a single threaded state. In some embodiments, a denylist/blocklist of unsupported network interface drivers may be maintained and checked against when determining whether a particular network interface driver is supported for RSS (e.g., at 504).

At 506, the RSS configuration component may check for channel (queue) support. For example, the RSS configuration component may check whether the network interface driver supports channel operations. Channel operations may be used to set the number of traffic receive queues. The RSS configuration component may also check whether the network interface driver supports a sufficient number of channels. Network interface drivers are configured with a set maximum number of channels they support, so if that number is insufficient (e.g., if the maximum number of channels is 1 or 0), then the RSS configuration component may not be capable of generating an RSS configuration that enables the implementation of RSS and/or multithreading.

At 508, the RSS configuration component may assign processor cores for each enabled network sensor task (e.g., DPI and/or IDS). In some embodiments, assigning processor cores (at 508) may include determining available processor cores, determining processor cores to set aside for other tasks, and/or determining a limit on the number of processor cores assigned to each task, e.g., as discussed in further detail herein with reference to FIG. 6.

As indicated in FIG. 5, operation 424 (applying the RSS configuration) may include: at 510, enabling RSS and multithreading; and/or at 514, setting IRQ affinities; etc. Enabling RSS and multithreading, at 510, may include setting up receive (RX) queues. This may include, for example, setting the number of network interface queues, setting the RSS hash function, and/or setting the indirection table, etc. In some embodiments, the number of network interface queues may be set to equal the number of assigned processor cores per task. This can be done, for example, when it is intended that each queue will be responded to by one processor core per task. The RSS hash function may be used to determine which queue an incoming packet ends up on. The hash function may return hash values that are calculated based on the source and destination information (e.g., IP address and ports) in the packet. According to various embodiments, a symmetric hash function may be used to ensure both directions of flows are processed on the same processor core.

At 512, the RSS configuration component may set IRQ affinities. Each queue may have its own IRQ/interrupt that it uses to report incoming traffic to the CPU. Setting the affinity of these IRQs can ensure that only specific processor cores respond to each IRQ. In some embodiments, setting the IRQ affinities can tie each queue to a single processor core, linking them so that only that processor core processes traffic that arrives on that queue. This may avoid the problem of processor cores/threads tripping over each other trying to respond to queues, or any queues being neglected as processor cores try to fight over queues.

Figure 6:
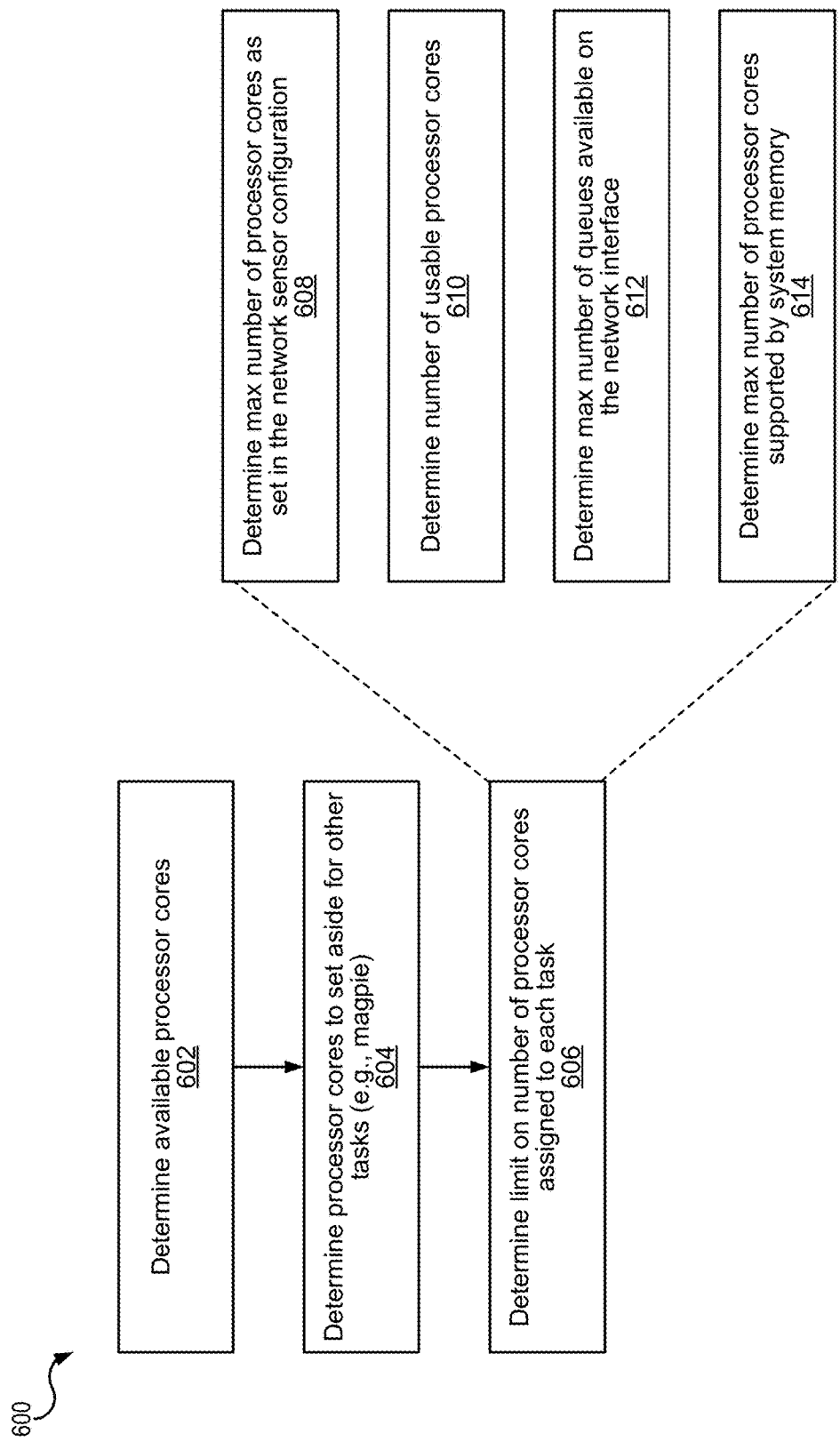
FIG. 6 is an example process of using an RSS configuration component to assign processor cores for network sensor tasks, in accordance with some embodiments

FIG. 6 is an example process 600 of using an RSS configuration component to assign processor cores for network sensor tasks, in accordance with some embodiments. At 602, the process 600 may include determining available processor cores. At 604, the process 600 may include determining processor cores to set aside for other tasks (e.g., besides network sensor enabled tasks). In some non-limiting embodiments, the number of processor cores set aside for other tasks may be hardcoded to a particular number. The remaining processor cores (e.g., besides those set aside for other tasks) may be divided among enabled network sensor tasks (e.g., DPI and/or IDS). In some non-limiting embodiments, the remaining processor cores may be divided evenly among enabled network sensor tasks. However, it should be understood that the remaining processor cores may be divided among the enabled sensor tasks in a different manner in other embodiments.

At 606, the process 600 may include determining a limit on the number of processor cores assigned to each enabled network sensor task. According to some embodiments, determining the limit on the number of processor cores assigned to each enabled network sensor task may include determining the lowest value from among one or more of: (i) a maximum number of processor cores as set in the network sensor configuration, (ii) a number of usable processor cores, (iii) a maximum number of queues available on the network interface, and/or (iv) a maximum number of processor cores supported by system memory.

At 608, the process 600 may include determining the maximum number of processor cores as set in the network sensor configuration. In some embodiments, the maximum number of processor cores set in the network sensor configuration may default to a particular number. However, the maximum number of processor cores may be configurable in other embodiments.

At 610, the process 600 may include determining the number of usable processor cores. In some examples, unusable processor cores may be those which have either been configured as forbidden by the host configuration, or do not have sufficient IRQ vector space to apply IRQ affinity later on in the RSS configuration application stage.

At 612, the process 600 may include determining the maximum number of queues available on the network interface. In some examples, this may be a hardware limit built into the network interface. In some embodiments, the network interface may be configured (e.g., via an RSS configuration generated by the RSS configuration component) such that each queue is served by one processor core. For example, this may allow for each individual DPI/IDS thread to mirror a single threaded state.

At 614, the process 600 may include determining the maximum number of processor cores supported by system memory. In some embodiments, the maximum number of processor cores supported by system memory is equal to:

(Total available memory—Memory reserved for other tasks)/Memory required per processor core The memory requirement per processor core may be a known value calculated based on known memory usage of a single DPI or IDS thread.

Figure 7:
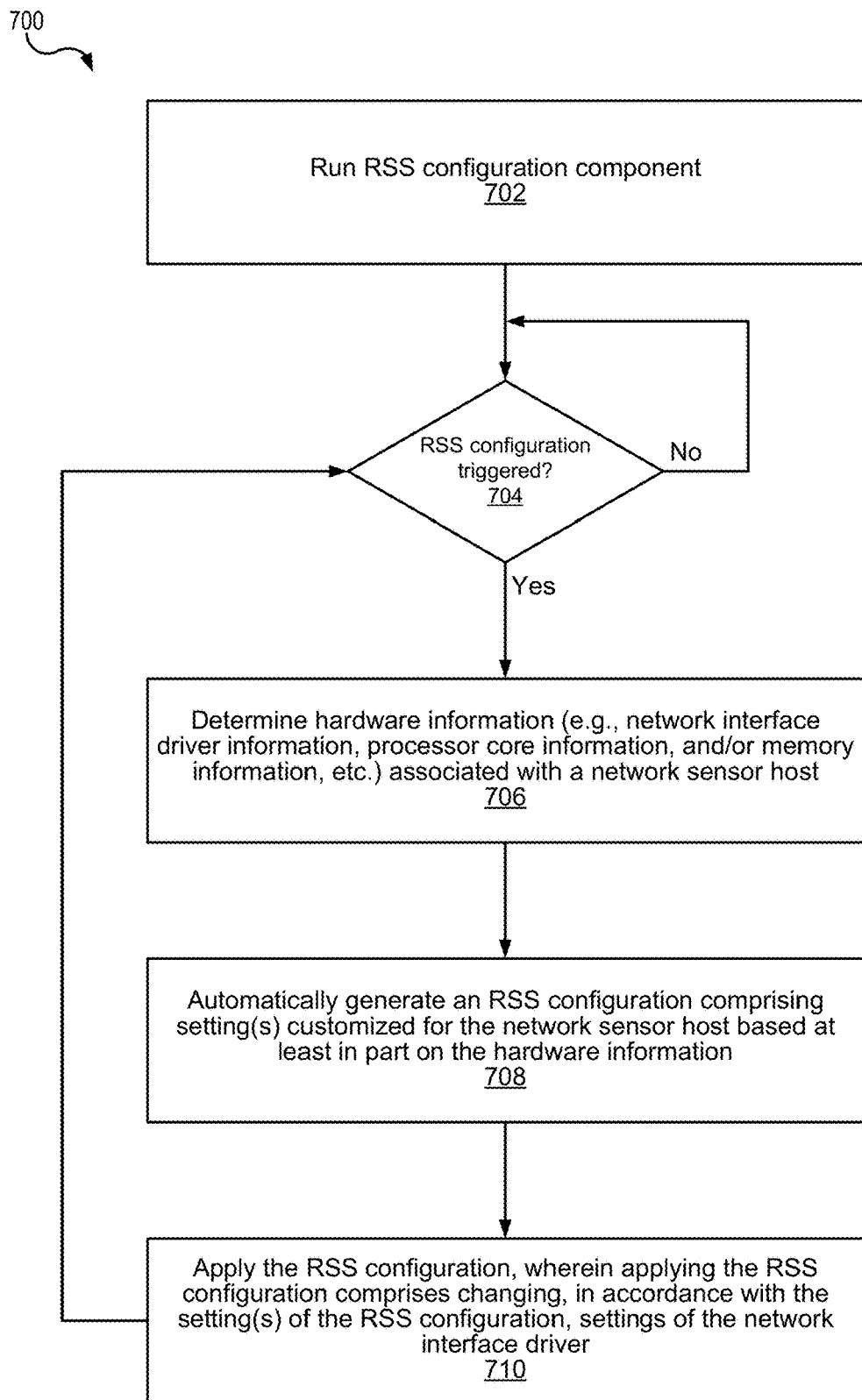
FIG. 7 is a flowchart that illustrates an example process of using an RSS configuration component to generate and apply an RSS configuration, in accordance with some embodiments.

FIG. 7 is a flowchart that illustrates an example process 700 of using an RSS configuration component to generate and apply an RSS configuration, in accordance with some embodiments.

At 702, the process 700 includes running an RSS configuration component. In various implementations, the RSS configuration component may be a software application installed and run on a network sensor host, e.g., as discussed herein with reference to FIGS. 1-6.

At 704, the process 700 may include determining whether an RSS configuration is triggered. In some embodiments, the RSS configuration component may be configured to automatically perform one or more RSS configuration operations in response to the network sensor starting. Additionally, or alternatively, the RSS configuration component may be configured to automatically perform one or more RSS configuration operations in response to the network sensor receiving a configuration change. In these non-limiting examples, the RSS configuration may be considered to be triggered in response to the network sensor starting and/or in response to the network sensor receiving a configuration change. However, it should be understood that other events may trigger RSS configuration operation(s).

If, at 704, it is determined that an RSS configuration is triggered, then the process 700 may include determining hardware information associated with the network sensor host, at 706. For example, as discussed herein with reference to FIG. 4, the hardware information may include network interface driver information, processor core information, and/or memory information, etc. The network interface driver information may be associated with a network interface of the network sensor host. The processor core information may be associated with one or more processor cores of the network sensor host. The memory information may be associated with an amount of memory on the network sensor host.

At 708, the process 700 may include automatically generating an RSS configuration comprising setting(s) customized for the network sensor host based at least in part on the hardware information. In some embodiments, the setting(s) may include one or more RSS settings, one or more multithreading settings, and/or one or more interrupt request (IRQ) affinity settings, etc. For example, the RSS setting(s) may be configured to enable the network interface driver to implement RSS for the network interface. The multithreading setting(s) may be configured to enable the network interface driver to implement, at least in part, multithreading for network sensor tasks.

At 710, the process 700 may include applying the RSS configuration. According to various implementations, applying the RSS configuration may include changing (e.g., in accordance with the setting(s) of the RSS configuration) settings of the network sensor driver.

If, at 704, it is determined that the RSS configuration is not triggered, then the process 700 may continue monitoring/checking whether the RSS configuration is triggered, at 704. FIG. 7 indicates that the process 700 continues monitoring/checking whether the RSS configuration is triggered after applying the RSS configuration, at 710. However, the process 700 may include monitoring/checking whether the RSS configuration is triggered at any suitable time and/or at any suitable frequency in various embodiments.

Figure 8:
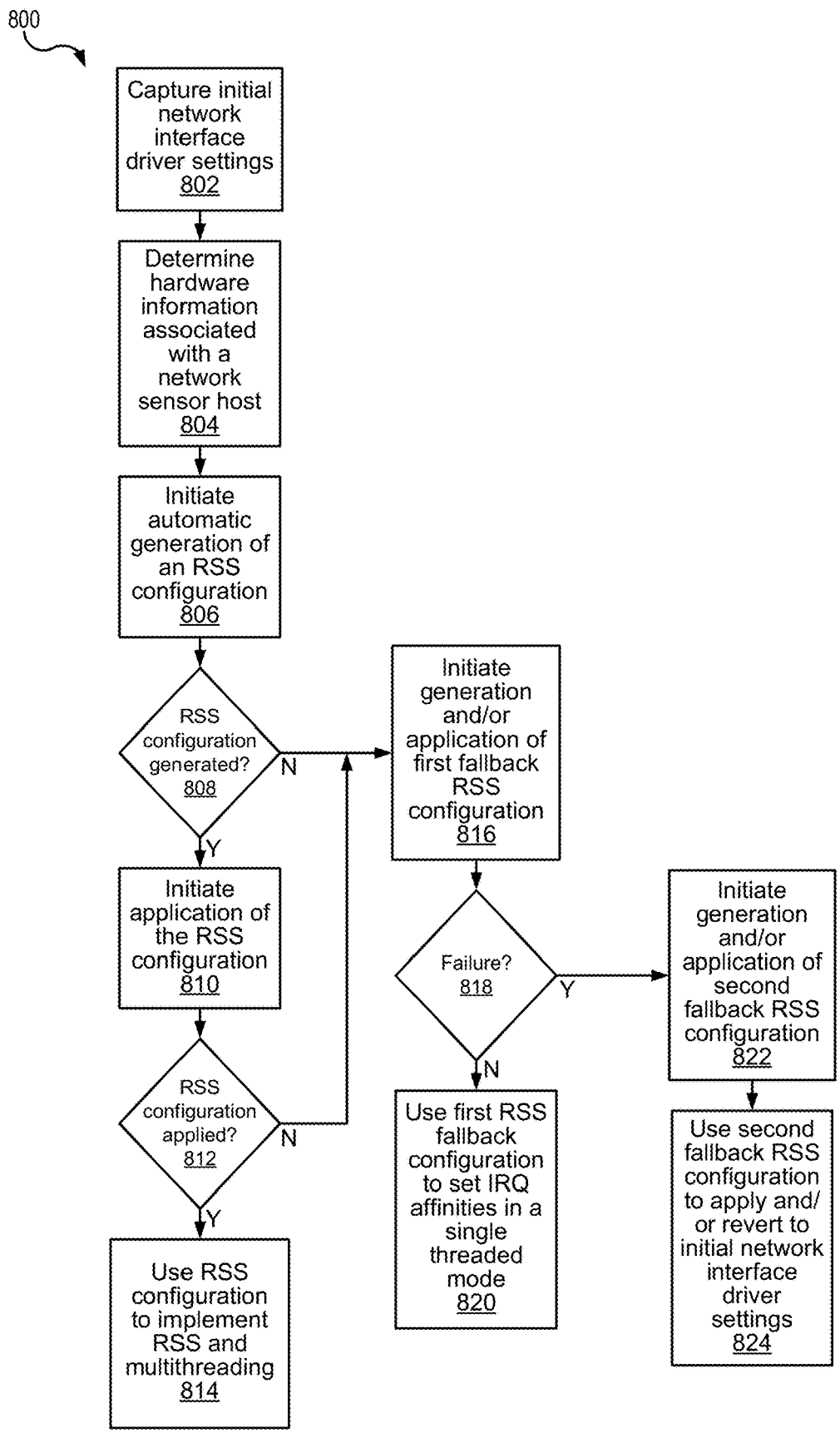
FIG. 8 is a flowchart that illustrates an example process of using an RSS configuration component to generate and/or apply an RSS configuration and/or one or more fallback RSS configurations, in accordance with some embodiments.

FIG. 8 is a flowchart that illustrates an example process 800 of using an RSS configuration component to generate and/or apply an RSS configuration and/or one or more fallback RSS configurations, in accordance with some embodiments.

At 802, the process 800 may include capturing initial network interface settings. The captured initial network interface settings may be stored, for example, to enable reverting back to the initial network interface settings under certain circumstances. For example, as further discussed herein, the initial network interface settings may be used as a fallback RSS configuration in some embodiments.

At 804, the process 800 may include determining hardware information associated with the network sensor host. For example, as discussed herein with reference to FIG. 4, the hardware information may include network interface driver information, processor core information, and/or memory information, etc. The network interface driver information may be associated with a network interface of the network sensor host. The processor core information may be associated with one or more processor cores of the network sensor host. The memory information may be associated with an amount of memory on the network sensor host.

At 806, the process 800 may include initiating automatic generation of an RSS configuration. For example, as discussed herein with reference to FIG. 5, generating an RSS configuration may include checking for fanout support, checking whether network interface driver(s) is/are supported for RSS, checking for channel (queue) support, and/or assigning processor cores for each enabled task (e.g., DPI and/or IDS), etc. Initiating automatic generation of an RSS configuration may include initiating and/or performing one or more of these operations in various embodiments. In doing so, one or more failures may occur that prevent successful generation of a particular RSS configuration. As further discussed herein, in some embodiments the RSS configuration component may generate and/or apply one or more fallback RSS configurations to handle certain failure circumstances.

In some embodiments, the RSS configuration component may determine that the network interface driver supports RSS. For example, the RSS configuration component may determine that the network interface driver supports RSS based at least in part on the network interface driver information. In response to determining that the network interface driver supports RSS, the setting(s) of the RSS configuration may include RSS setting(s) that enable RSS for the network interface.

In some embodiments, the RSS configuration component may determine that the network sensor host has a sufficient number of processor cores to satisfy a threshold number of processor cores for implementing multithreading for network sensor tasks. For example, the RSS configuration component may determine that the network sensor host has a sufficient number of processor cores based at least in part on the processor core information. In response to determining that the network sensor host has a sufficient number of processor cores, the setting(s) of the RSS configuration may include multithreading setting(s).

According to some embodiments, determining the multithreading setting(s) may include assigning processor cores to network sensor tasks. As a non-limiting example, assigning processor cores to network sensor tasks may include assigning a first processor core to a first enabled network sensor task. Furthermore, in this non-limiting example, assigning processor cores to network sensor tasks may include assigning a second processor core to a second enabled network sensor task.

At 808, the process 800 may include determining whether the RSS configuration was successfully generated. If, at 808, it is determined that the RSS configuration was generated, then the process 800 may include initiating application of the RSS configuration, at 810. According to various implementations, applying the RSS configuration may include changing (e.g., in accordance with the setting(s) of the RSS configuration) settings of the network sensor driver. For example, as discussed herein with reference to FIG. 5, applying the RSS configuration may include setting a number of network interface queues (e.g., to equal the number of assigned cores per task), setting RSS hash values, and/or setting IRQ affinities, etc. Initiating application of the RSS configuration may include initiating and/or performing one or more of these operations in various embodiments. In doing so, one or more failures may occur that prevent successful application of a particular RSS configuration. As further discussed herein, in some embodiments the RSS configuration component may generate one or more fallback RSS configurations to handle certain failure circumstances.

At 812, the process 800 may include determining whether the RSS configuration was successfully applied. If, at 812, it is determined that the RSS configuration was successfully applied, then the process 800 may include using the RSS configuration to implement RSS and multithreading, at 814, according to some embodiments.

If, at 808, it is determined that RSS configuration was not successfully generated, then the process 800 may include initiating generation and/or application of a first fallback RSS configuration, at 816. In some embodiments, the first fallback RSS configuration may include IRQ affinity setting(s). Furthermore, applying the first fallback RSS configuration may include configuring the network interface driver to implement single threading instead of multithreading. Additionally, or alternatively, applying the first fallback RSS configuration may include setting, based on the IRQ affinity setting(s), one or more IRQ settings.

At 818, the process 800 may include determining whether a failure has occurred in association with the generation and/or application of the first fallback RSS configuration. If, at 818, it is determined that a failure has not occurred, then the process 800 may include using the first RSS fallback configuration to set IRQ affinities in a single threaded state, at 820.

If, at 818, it is determined that a failure has occurred, then the process 800 may include initiating generation and/or application of a second fallback RSS configuration, at 822. Applying the second fallback RSS configuration may include configuring the network interface driver to implement the initial network interface driver settings (e.g., the initial network interface driver settings captured at 802).

At 824, the process 800 may include using the second fallback configuration to apply and/or revert to the initial network interface driver settings (e.g., the initial network driver settings captured at 802).

Figure 9:
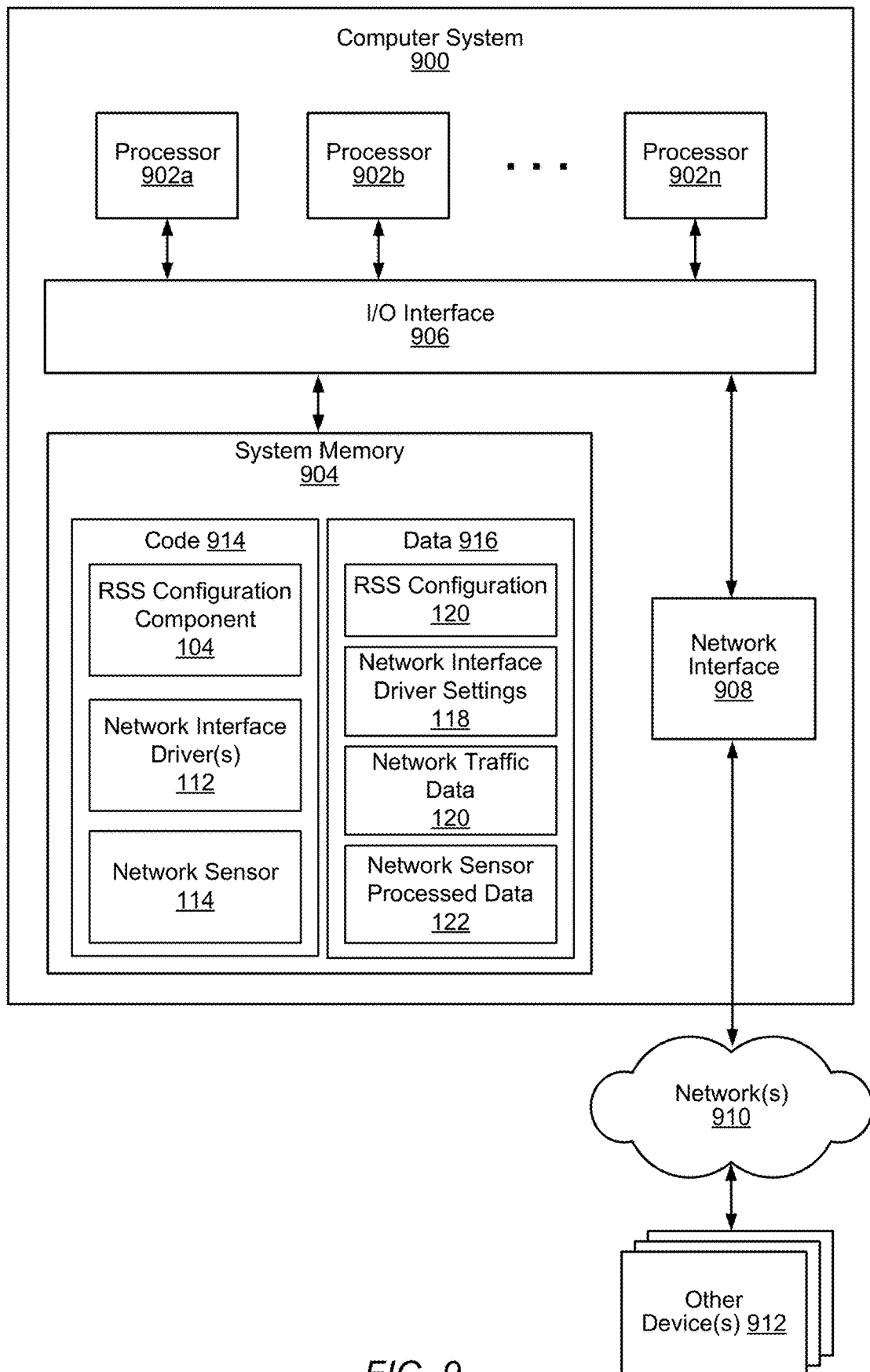
FIG. 9 is a block diagram illustrating an example computer system that may be used in a security environment that includes a network sensor host that implements an RSS configuration component, according to some embodiments.

FIG. 9 is a block diagram illustrating an example computer system 900 that may be used in a security environment that includes a network sensor host that implements an RSS configuration component, according to some embodiments. For example, the computer system 900 may be a network sensor host (e.g., network sensor host 102 in FIG. 1) that implements one or more components disclosed herein with reference to FIGS. 1-8.

Computer system 900 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 900 includes one or more processors 902, which may include multiple cores coupled to a system memory 904 via an input/output (I/O) interface 906. Computer system 900 further includes a network interface 908 coupled to I/O interface 906. In some embodiments, computer system 900 may be a uniprocessor system including one processor 902, or a multiprocessor system including several processors 902a-n, as shown. The processors 902 may be any suitable processors capable of executing instructions. For example, in various embodiments, processors 902 may implement one of a number of instruction set architectures (ISAs), such as the x86, PowerPC, SPARC, or MIPS ISA.

As shown, the computer system 900 may also include one or more network communication devices (e.g., network interface 908) for communicating with other systems and/or components over a communications network (e.g., network(s) 910). For example, an instance of an application executing on computer system 900 may use network interface 908 to communicate with another server application executing on another computer system, as described herein.

As shown, computer system 900 may use its network interface 908 to communicate with one or more other devices 912, such as persistent storage devices and/or one or more I/O devices. In some embodiments, some of these other devices may be implemented locally on the computer system 900, accessible via the I/O interface 906. In various embodiments, persistent storage devices may include disk drives, tape drives, solid state memory, other mass storage devices, or any other persistent storage device. The computer system 900 may store instructions and/or data in persistent storage devices and retrieve the stored instruction and/or data as needed.

As shown, the computer system 900 may include one or more system memories 904 that store instructions and data accessible by processor(s) 902. In various embodiments, system memories 904 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 904 may be used to store code 914 or executable instructions to implement the methods and techniques described herein. As a non-limiting example, the executable instructions may include instructions to implement an RSS configuration component 104, network interface driver(s) 112, and/or a network sensor 114, etc., as discussed herein with reference to FIG. 1. The system memory 904 may also be used to store data 916 needed or produced by the executable instructions. As a non-limiting example, the in-memory data 916 may include data associated with an RSS configuration 120, network interface driver settings 118, network traffic data 120, and/or network sensor processed data, etc., as discussed herein with reference to FIG. 1.

In some embodiments, some of the code 914 or executable instructions may be persistently stored on the computer system 900 and may have been loaded from external storage media. The persistent storage of the computer system 900 and the external media are examples of non-transitory computer-readable storage media, which may be used to store program instructions to be executed by the computer system 900. A non-transitory computer-readable storage medium may provide the capability to store information in a form readable by a machine (e.g., computer system 900). Non-transitory computer-readable media may include storage media such as magnetic or optical media, disk or DVD/CD-ROM devices, archival tapes, network-attached storage systems, or other computer systems.

In some embodiments, the I/O interface 906 may be configured to coordinate I/O traffic between processor 902, system memory 904 and any peripheral devices in the system, including through network interface 908 or other peripheral interfaces. In some embodiments, I/O interface 906 may perform any necessary protocol, timing, or other data transformations to convert data signals from one component (e.g., system memory 904) into a format suitable for use by another component (e.g., processor 902). In some embodiments, I/O interface 906 may include support for devices attached through various types of peripheral buses, such as a variant of the Peripheral Component Interconnect (PCI) bus standard or the Universal Serial Bus (USB) standard, for example. In some embodiments, the function of I/O interface 906 may be split into two or more separate components, such as a north bridge and a south bridge, for example. Also, in some embodiments, some or all of the functionality of I/O interface 906, such as an interface to system memory 904, may be incorporated directly into processor 902.

In some embodiments, the network interface 908 may allow data to be exchanged between computer system 900 and other devices attached to a network. The network interface 908 may also allow communication between computer system 900 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 908. Network interface 908 may commonly support one or more wireless networking protocols (e.g., Wi-Fi/IEEE 802.11, or another wireless networking standard). In some embodiments, the network interface 908 may support communication via telecommunications/telephony networks such as analog voice networks or digital fiber communications networks, via storage area networks such as Fibre Channel SANs, or via any other suitable type of network and/or protocol.

In some implementations, advantages and features of the present disclosure may be further described by the following 20 statements.

1. A method, comprising: determining hardware information associated with a computing device that hosts a network sensor, wherein the hardware information comprises: network interface driver information associated with a network interface of the computing device; and processor core information associated with one or more processor cores of the computing device; initiating automatic generation of a receive side scaling (RSS) configuration comprising one or more settings customized for the computing device based at least in part on the hardware information, wherein the one or more settings comprise at least one of: one or more RSS settings; one or more multithreading settings; or one or more interrupt request (IRQ) affinity settings; and responsive to determining that the RSS configuration has been generated: initiating application of the RSS configuration, wherein application of the RSS configuration changes, in accordance with the one or more settings of the RSS configuration, settings of the network interface driver.

2. The method of statement 1, wherein the initiating automatic generation of the RSS configuration comprises: determining, based at least in part on the network interface driver information, that the network interface driver supports RSS, wherein, responsive to the determining that the network interface driver supports RSS, the one or more settings comprise one or more RSS settings that enable RSS for the network interface.

3. The method of any of the preceding statements, wherein the initiating automatic generation of the RSS configuration further comprises: determining, based at least in part on the processor core information, that the computing device has a sufficient number of processor cores to satisfy a threshold number of processor cores for implementing multithreading for network sensor tasks, wherein, responsive to the determining that the computing device has the sufficient number of processor cores, the one or more settings comprise the one or more multithreading settings.

4. The method of any of the preceding statements, wherein the initiating automatic generation of the RSS configuration further comprises: determining the one or more multithreading settings, wherein the determining the one or more multithreading settings comprises: assigning processor cores to network sensor tasks, wherein the assigning comprises: assigning a first processor core, of the processor cores, to a first enabled network sensor task; and assigning a second processor core, of the processor cores, to a second enabled network sensor task.

5. The method of any of the preceding statements, further comprising: installing an RSS configuration software component on the computing device, wherein, when executed and in response to one or more triggers, the RSS configuration software component causes the computing device to perform operations comprising: the determining the hardware information; and the initiating automatic generation of the RSS component.

6. The method of statement 5, wherein the one or more triggers comprise at least one of: the network sensor starting; or the network sensor receiving a configuration change.

7. The method of any of the preceding statements, further comprising: responsive to determining that a failure has occurred in association with generation or application of the RSS configuration, applying a first fallback RSS configuration, wherein: the first fallback RSS configuration comprises one or more IRQ affinity settings; and applying the first fallback RSS configuration comprises configuring the network interface driver to: implement single threading instead of multithreading; and set, based on the one or more IRQ affinity settings, one or more IRQ affinities.

8. The method of statement 7, further comprising: before initiating application of the RSS configuration or applying the first fallback RSS configuration, capturing initial network interface driver settings; and responsive to determining that a failure has occurred in association with applying the first fallback RSS configuration, applying a second fallback RSS configuration, wherein applying the second fallback RSS configuration comprises: configuring the network interface driver to implement the initial network interface driver settings.

9. A system comprising: a memory storing executable instructions; and one or more processors that execute the executable instructions to: determine hardware information associated with a computing device that hosts a network sensor, wherein the hardware information comprises: network interface driver information associated with a network interface of the computing device; and processor core information associated with one or more processor cores of the computing device; automatically generate a receive side scaling (RSS) configuration comprising one or more settings customized for the computing device based at least in part on the hardware information, wherein the one or more settings comprise at least one of: one or more RSS settings; one or more multithreading settings; or one or more interrupt request (IRQ) affinity settings; and apply the RSS configuration, wherein, to apply the RSS configuration, the one or more processors execute the executable instructions to: change, in accordance with the one or more settings of the RSS configuration, settings of the network interface driver.

10. The system of statement 9, wherein the one or more processors further execute the executable instructions to: install an RSS configuration software component, wherein, when executed on the one or more processors and in response to one or more triggers, the RSS configuration software component causes the one or more processors to perform operations comprising: the determining the hardware information; the automatically generating the RSS configuration; and the applying the RSS configuration.

11. The system of statement 10, wherein the one or more triggers comprise at least one of: the network sensor starting; or the network sensor receiving a configuration change.

12. The system of any of the preceding statements, wherein the hardware information further comprises: memory information associated with an amount of memory on the computing device.

13. The system of any of the preceding statements, wherein the one or more settings comprise: RSS settings configured to enable the network interface driver to implement RSS for the network interface; and multithreading settings configured to enable the network interface driver to implement, at least in part, multithreading for network sensor tasks.

14. The system of any of the preceding statements, wherein: the network interface driver is a network interface card (NIC) driver associated with a NIC of the computing device; and to automatically generate the RSS configuration, the one or more processors execute the executable instructions to: determine, based at least in part on the network interface driver information, whether the NIC driver supports RSS; and determine, based at least in part on the network interface driver information, whether the NIC driver supports multiple channels.

15. The system of any of the preceding statements, wherein, to automatically generate the RSS configuration, the one or more processors execute the executable instructions to: determine, based at least in part on the processor core information, that the computing device has a sufficient number of processor cores to satisfy a threshold number of processor cores for implementing multithreading for network sensor tasks; and determine the one or more multithreading settings, wherein, to determine the one or more multithreading settings, the one or more processors execute the executable instructions to: assign a first processor core, of the processor cores, to a first enabled network sensor task; and assign a second processor core, of the processor cores, to a second enabled network sensor task.

16. One or more non-transitory computer-accessible storage media storing executable instructions that, when executed by one or more processors, cause a computer system to: determine hardware information associated with a computing device that hosts a network sensor, wherein the hardware information comprises: network interface driver information associated with a network interface of the computing device; and processor core information associated with processor cores of the computing device; and automatically generate a receive side scaling (RSS) configuration comprising settings customized for the computing device based at least in part on the hardware information; wherein application of the RSS configuration changes, in accordance with the settings of the RSS configuration, settings of the network interface driver to implement RSS for the network interface and multithreading for network sensor tasks.

17. The non-transitory computer-accessible storage media of statement 16, wherein the settings of the RSS configuration comprise: a mapping of network interface queues to processor cores; RSS hash values; and interrupt request (IRQ) affinities.

18. The non-transitory computer-accessible storage media of any of the preceding statements, wherein the executable instructions, when executed by the one or more processors, further cause the computer system to: install an RSS configuration software component, wherein, when executed on one or more processors and in response to one or more triggers, the RSS configuration software component causes the one or more processors to: determine the hardware information; automatically generate the RSS configuration; and apply the RSS configuration.

19. The non-transitory computer-accessible storage media of statement 18, wherein the one or more triggers comprise at least one of: the network sensor starting; or the network sensor receiving a configuration change.

20. The non-transitory computer-accessible storage media of any of the preceding statements, wherein: the hardware information further comprises: memory information associated with an amount of memory on the computing device; and the executable instructions, when executed by the one or more processors, further cause the computer system to: automatically generate the RSS configuration based at least in part on the network interface driver information, the processor core information, and the memory information.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A method, comprising:
   determining hardware information associated with a computing device that hosts a network sensor, wherein the hardware information comprises:
      network interface driver information associated with a network interface of the computing device; and
      processor core information associated with one or more processor cores of the computing device;
   initiating automatic generation of a receive side scaling (RSS) configuration comprising one or more settings customized for the computing device based at least in part on the hardware information, wherein the one or more settings comprise at least one of:
      one or more RSS settings;
      one or more multithreading settings; or
      one or more interrupt request (IRQ) affinity settings; and
   responsive to determining that the RSS configuration has been generated:
      initiating application of the RSS configuration, wherein application of the RSS configuration changes, in accordance with the one or more settings of the RSS configuration, settings of the network interface driver.

2. The method of claim 1, wherein the initiating automatic generation of the RSS configuration comprises:
  determining, based at least in part on the network interface driver information, that the network interface driver supports RSS, wherein, responsive to the determining that the network interface driver supports RSS, the one or more settings comprise one or more RSS settings that enable RSS for the network interface.

3. The method of claim 2, wherein the initiating automatic generation of the RSS configuration further comprises:
  determining, based at least in part on the processor core information, that the computing device has a sufficient number of processor cores to satisfy a threshold number of processor cores for implementing multithreading for network sensor tasks, wherein, responsive to the determining that the computing device has the sufficient number of processor cores, the one or more settings comprise the one or more multithreading settings.

4. The method of claim 3, wherein the initiating automatic generation of the RSS configuration further comprises:
  determining the one or more multithreading settings, wherein the determining the one or more multithreading settings comprises:
    assigning processor cores to network sensor tasks, wherein the assigning comprises:
      assigning a first processor core, of the processor cores, to a first enabled network sensor task; and
      assigning a second processor core, of the processor cores, to a second enabled network sensor task.

5. The method of claim 1, further comprising:
  installing an RSS configuration software component on the computing device, wherein, when executed and in response to one or more triggers, the RSS configuration software component causes the computing device to perform operations comprising:
    the determining the hardware information; and
    the initiating automatic generation of the RSS component.

6. The method of claim 5, wherein the one or more triggers comprise at least one of:
  the network sensor starting; or
  the network sensor receiving a configuration change.

7. The method of claim 1, further comprising:
  responsive to determining that a failure has occurred in association with generation or application of the RSS configuration, applying a first fallback RSS configuration, wherein:
    the first fallback RSS configuration comprises one or more IRQ affinity settings; and
    applying the first fallback RSS configuration comprises configuring the network interface driver to:
      implement single threading instead of multithreading; and
      set, based on the one or more IRQ affinity settings, one or more IRQ affinities.

8. The method of claim 7, further comprising:
  before initiating application of the RSS configuration or applying the first fallback RSS configuration, capturing initial network interface driver settings; and
  responsive to determining that a failure has occurred in association with applying the first fallback RSS configuration, applying a second fallback RSS configuration, wherein applying the second fallback RSS configuration comprises:
    configuring the network interface driver to implement the initial network interface driver settings.

9. A system comprising:
  a memory storing executable instructions; and
  one or more processors that execute the executable instructions to:
    determine hardware information associated with a computing device that hosts a network sensor, wherein the hardware information comprises:
      network interface driver information associated with a network interface of the computing device; and
      processor core information associated with one or more processor cores of the computing device;
    automatically generate a receive side scaling (RSS) configuration comprising one or more settings customized for the computing device based at least in part on the hardware information, wherein the one or more settings comprise at least one of:
      one or more RSS settings;
      one or more multithreading settings; or
      one or more interrupt request (IRQ) affinity settings; and
    apply the RSS configuration, wherein, to apply the RSS configuration, the one or more processors execute the executable instructions to:
      change, in accordance with the one or more settings of the RSS configuration, settings of the network interface driver.

10. The system of claim 9, wherein the one or more processors further execute the executable instructions to:
  install an RSS configuration software component, wherein, when executed on the one or more processors and in response to one or more triggers, the RSS configuration software component causes the one or more processors to perform operations comprising:
    the determining the hardware information;
    the automatically generating the RSS configuration; and
    the applying the RSS configuration.

11. The system of claim 10, wherein the one or more triggers comprise at least one of:
  the network sensor starting; or
  the network sensor receiving a configuration change.

12. The system of claim 9, wherein the hardware information further comprises:
  memory information associated with an amount of memory on the computing device.

13. The system of claim 12, wherein the one or more settings comprise:
  RSS settings configured to enable the network interface driver to implement RSS for the network interface; and
  multithreading settings configured to enable the network interface driver to implement, at least in part, multithreading for network sensor tasks.

14. The system of claim 9, wherein:
  the network interface driver is a network interface card (NIC) driver associated with a NIC of the computing device; and
  to automatically generate the RSS configuration, the one or more processors execute the executable instructions to:
    determine, based at least in part on the network interface driver information, whether the NIC driver supports RSS; and
    determine, based at least in part on the network interface driver information, whether the NIC driver supports multiple channels.

15. The system of claim 9, wherein, to automatically generate the RSS configuration, the one or more processors execute the executable instructions to:
- determine, based at least in part on the processor core information, that the computing device has a sufficient number of processor cores to satisfy a threshold number of processor cores for implementing multithreading for network sensor tasks; and
- determine the one or more multithreading settings, wherein, to determine the one or more multithreading settings, the one or more processors execute the executable instructions to:
  - assign a first processor core, of the processor cores, to a first enabled network sensor task; and
  - assign a second processor core, of the processor cores, to a second enabled network sensor task.

16. One or more non-transitory computer-accessible storage media storing executable instructions that, when executed by one or more processors, cause a computer system to:
- determine hardware information associated with a computing device that hosts a network sensor, wherein the hardware information comprises:
  - network interface driver information associated with a network interface of the computing device; and
  - processor core information associated with processor cores of the computing device; and
- automatically generate a receive side scaling (RSS) configuration comprising settings customized for the computing device based at least in part on the hardware information;
- wherein application of the RSS configuration changes, in accordance with the settings of the RSS configuration, settings of the network interface driver to implement RSS for the network interface and multithreading for network sensor tasks.

17. The one or more non-transitory computer-accessible storage media of claim 16, wherein the settings of the RSS configuration comprise:
- a mapping of network interface queues to processor cores;
- RSS hash values; and
- interrupt request (IRQ) affinities.

18. The one or more non-transitory computer-accessible storage media of claim 16, wherein the executable instructions, when executed by the one or more processors, further cause the computer system to:
- install an RSS configuration software component, wherein, when executed on one or more processors and in response to one or more triggers, the RSS configuration software component causes the one or more processors to:
  - determine the hardware information;
  - automatically generate the RSS configuration; and
  - apply the RSS configuration.

19. The one or more non-transitory computer-accessible storage media of claim 18, wherein the one or more triggers comprise at least one of:
- the network sensor starting; or
- the network sensor receiving a configuration change.

20. The one or more non-transitory computer-accessible storage media of claim 16, wherein:
- the hardware information further comprises:
  - memory information associated with an amount of memory on the computing device; and
- the executable instructions, when executed by the one or more processors, further cause the computer system to:
  - automatically generate the RSS configuration based at least in part on the network interface driver information, the processor core information, and the memory information.

* * * * *